(12) United States Patent
Brusilovski et al.

(10) Patent No.: US 12,024,365 B2
(45) Date of Patent: *Jul. 2, 2024

(54) TRAY FEEDER TRAY PULLING MECHANISM

(71) Applicant: Bright Machines, Inc., San Francisco, CA (US)

(72) Inventors: Gregory Brusilovski, Kfar Saba (IL); Arkady Nayman, Kfar Saba (IL)

(73) Assignee: Bright Machines, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,488

(22) Filed: Aug. 7, 2023

(65) Prior Publication Data

US 2023/0373718 A1 Nov. 23, 2023

Related U.S. Application Data

(63) Continuation of application No. 17/062,548, filed on Oct. 3, 2020, now Pat. No. 11,718,476.

(30) Foreign Application Priority Data

Dec. 22, 2019 (IL) .......................................... 271654

(51) Int. Cl.
  *B65G 1/06* (2006.01)
  *B25J 15/00* (2006.01)
  *B65G 47/90* (2006.01)

(52) U.S. Cl.
  CPC ............ *B65G 1/06* (2013.01); *B25J 15/0047* (2013.01); *B65G 47/901* (2013.01)

(58) Field of Classification Search
  CPC ...... B65G 1/06; B65G 47/901; B65G 1/0435; B65G 1/0485; B25J 15/0047; G01N 2035/0425; Y10T 436/114165
  USPC .................................................. 312/126–127
  See application file for complete search history.

(56) References Cited

U.S. PATENT DOCUMENTS

| | | | | |
|---|---|---|---|---|
| 4,720,463 | A | * | 1/1988 | Farber .................... G01N 35/00 414/331.14 |
| 4,856,073 | A | * | 8/1989 | Farber .................... G01N 35/00 382/128 |
| 5,002,449 | A | * | 3/1991 | Kita ..................... B65G 1/0492 414/280 |

(Continued)

FOREIGN PATENT DOCUMENTS

| | | |
|---|---|---|
| JP | 06-014816 A | 1/1994 |
| JP | 06014816 A * | 1/1994 |

(Continued)

OTHER PUBLICATIONS

International Search Report and Written Opinion, PCT App. No. PCT/US2020/070945, dated Mar. 26, 2021, 12 pages.

(Continued)

*Primary Examiner* — Gerald McClain
(74) *Attorney, Agent, or Firm* — Nicholson De Vos Webster & Elliott LLP; Judith Szepesi

(57) ABSTRACT

A tray feeder mechanism comprising a plurality of trays within a tray feeder, each tray including a tray handle, and a gripper positioned within a gripping area defined by the tray handles, wherein the gripper is configured to remove a tray from the tray feeder when the tray feeder stops.

20 Claims, 9 Drawing Sheets

(56) References Cited

U.S. PATENT DOCUMENTS

| | | | | |
|---|---|---|---|---|
| 5,203,661 | A | * | 4/1993 | Tanita .................. H05K 13/021 |
| | | | | 414/280 |
| 5,744,322 | A | * | 4/1998 | Krejcarek ........ G01N 35/00029 |
| | | | | 435/286.2 |
| 6,099,230 | A | * | 8/2000 | Hitch ...................... B01L 9/523 |
| | | | | 414/331.03 |
| 6,843,962 | B2 | * | 1/2005 | Haslam ................ G01N 35/028 |
| | | | | 422/510 |
| 7,635,246 | B2 | | 12/2009 | Neeper et al. |
| 9,193,531 | B2 | * | 11/2015 | Hirasawa .......... H01L 21/67742 |
| 2003/0044991 | A1 | * | 3/2003 | Haslam ................ G01N 35/04 |
| | | | | 422/65 |
| 2006/0099055 | A1 | * | 5/2006 | Stefani ................ B65G 1/0435 |
| | | | | 414/277 |
| 2014/0109527 | A1 | * | 4/2014 | Burri ...................... G01N 35/00 |
| | | | | 422/65 |
| 2014/0262979 | A1 | * | 9/2014 | Bonora ............. H01L 21/67271 |
| | | | | 209/577 |
| 2017/0370955 | A1 | * | 12/2017 | Neeper .................. B65G 1/127 |
| 2020/0239230 | A1 | * | 7/2020 | Kozlenok ................ B65G 1/10 |
| 2022/0081211 | A1 | * | 3/2022 | Kütt ........................ G07F 17/13 |

FOREIGN PATENT DOCUMENTS

| | | | |
|---|---|---|---|
| JP | 2006103874 A | * | 4/2006 |
| WO | 2011/155821 A1 | | 12/2011 |

OTHER PUBLICATIONS

Office Action, IL App. No. 271654, dated Feb. 28, 2023, 7 pages (4 pages of English Translation and 3 pages of Original Document).

* cited by examiner

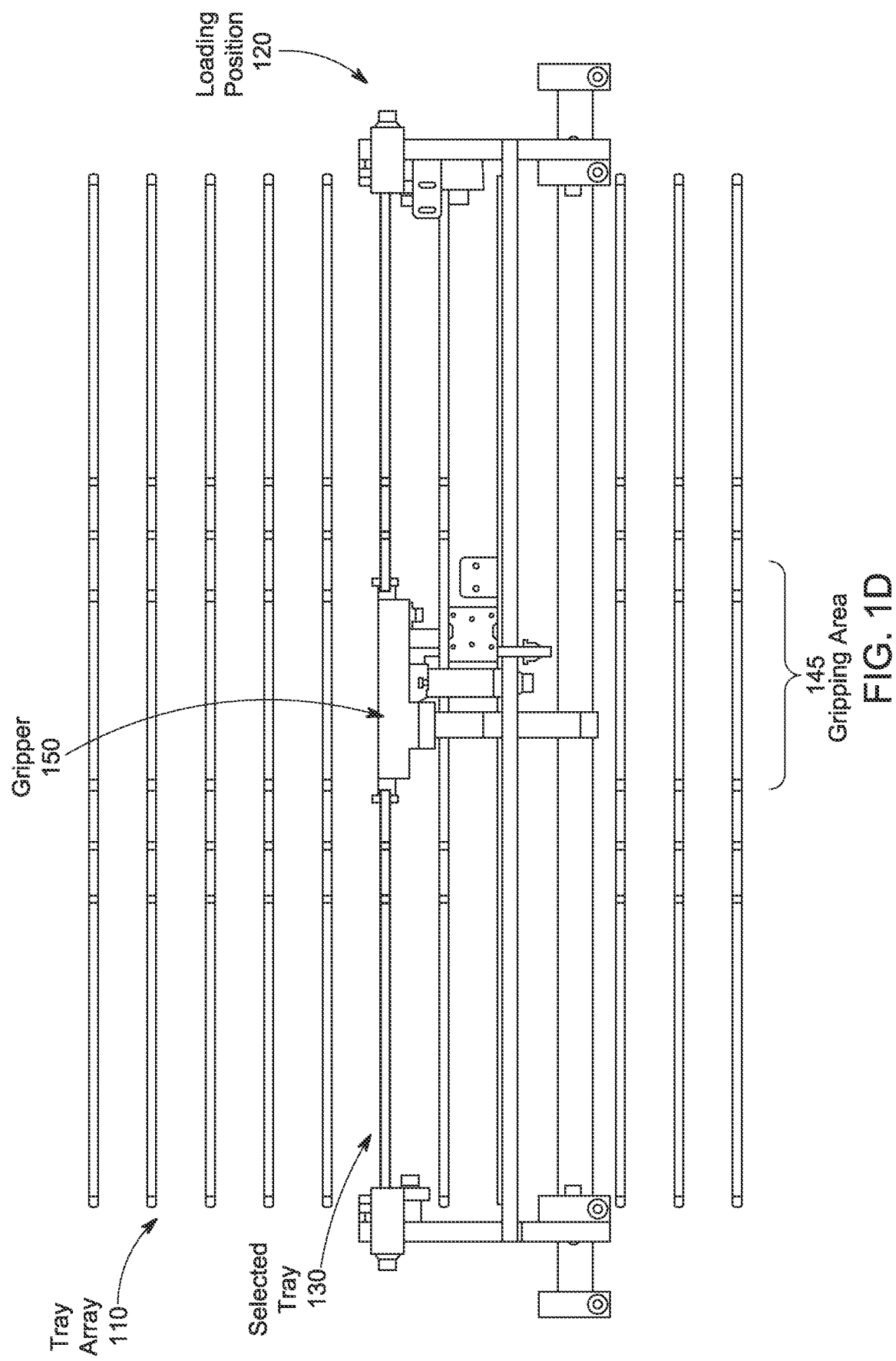

TRAY FEEDER TRAY PULLING MECHANISM

RELATED APPLICATIONS

The present application is a continuation of U.S. patent application Ser. No. 17/062,548, filed Oct. 3, 2020, issuing as U.S. Pat. No. 11,718,476 on Aug. 8, 2023, which application claims priority to Israeli Patent Application No. 271654, filed on Dec. 22, 2019, both of which are incorporated herein by reference in their entirety.

FIELD

The present invention relates to manufacturing, and in particular to an improved tray pulling mechanism.

BACKGROUND

Tray feeders are a common way to provide parts to an assembly station. In general, tray feeders are coupled to an assembly station, and loaded with a set of trays directly or using a dedicated cart, which may handle a certain number of trays. The trays move up and down within the tray feeder.

In one embodiment, the following prior art process is used to pull a tray with parts from the tray feeder to make the parts available to the assembly station. First, the tray feeder moves the trays in vertical direction and stops when the correct tray is in the "loading" position. Then, a needle or puller moves toward the tray puller. The tray to be pulled is lifted up, and the needle puller moves under it. The tray to be picked up is then dropped down onto the needle puller. The needle puller than moves back out, taking with it the selected tray. The process is repeated in reverse when a tray is returned to the tray feeder, after its use. This process takes approximately 15 seconds. This is a relatively long time and makes it inefficient to pull elements from multiple trays for assembly.

In another prior art configuration, trays are pulled by a dedicated gripper, which, after the correct tray reaches the "loading" position, approaches the tray, and then pulls it to the assembly area.

BRIEF DESCRIPTION OF THE FIGURES

The present invention is illustrated by way of example, and not by way of limitation, in the figures of the accompanying drawings and in which like reference numerals refer to similar elements and in which:

FIG. 1D is a front view of one embodiment of the tray array.

DETAILED DESCRIPTION

Tray feeding systems allow the following functionality:
1) extracting of the trays of processed parts from tray feeder,
2) precise positioning of trays in the assembly station working area,
3) return of the emptied trays to the cart.

The improved tray feeding system allows a significant decrease of the overall process cycle time by eliminating a need of an array of trays or tray cart intermediate motion for releasing the returned tray, removing the gripping mechanism from the cart moving zone, return of the gripping mechanism and lowering the cart onto the gripping mechanism. This is accomplished by creating an improved design which allows a vertical motion of the trays while the gripping mechanism is prepositioned in the gripping area of the tray, and thus permits the nearly instantaneous removal of the tray when the vertical motion of the tray array stops, with the correct tray positioned in the loading position.

In one embodiment, each tray includes handles, which extend from the tray area. The handles may be any shape that has a gap in the middle and undercuts from both sides. The gap provides a path for the puller, which provides the motive power for the gripper. The undercuts are the areas where the gripper contacts the tray, to pull it. In one embodiment, the handles create a cavity which defines the gripping area, where the gripper is prepositioned when it is not pulling out a tray. The handles, in one embodiment, are integral with the tray. In one embodiment, the handles may be separately attached to the tray.

To pull out a tray, the gripper simply has to move, when the tray is correctly positioned for pulling. The gripper engages with the tray handle and pulls out the tray. To return the tray to the tray feeder, in one embodiment, after the gripper delivers the tray to the appropriate assembly location, the gripper pushes the tray back into an empty slot in the tray array. In one embodiment, the entirety of this process, from pulling out the tray to returning the gripper to the ready position can take less than 8 seconds, depending on the tray size and payload.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
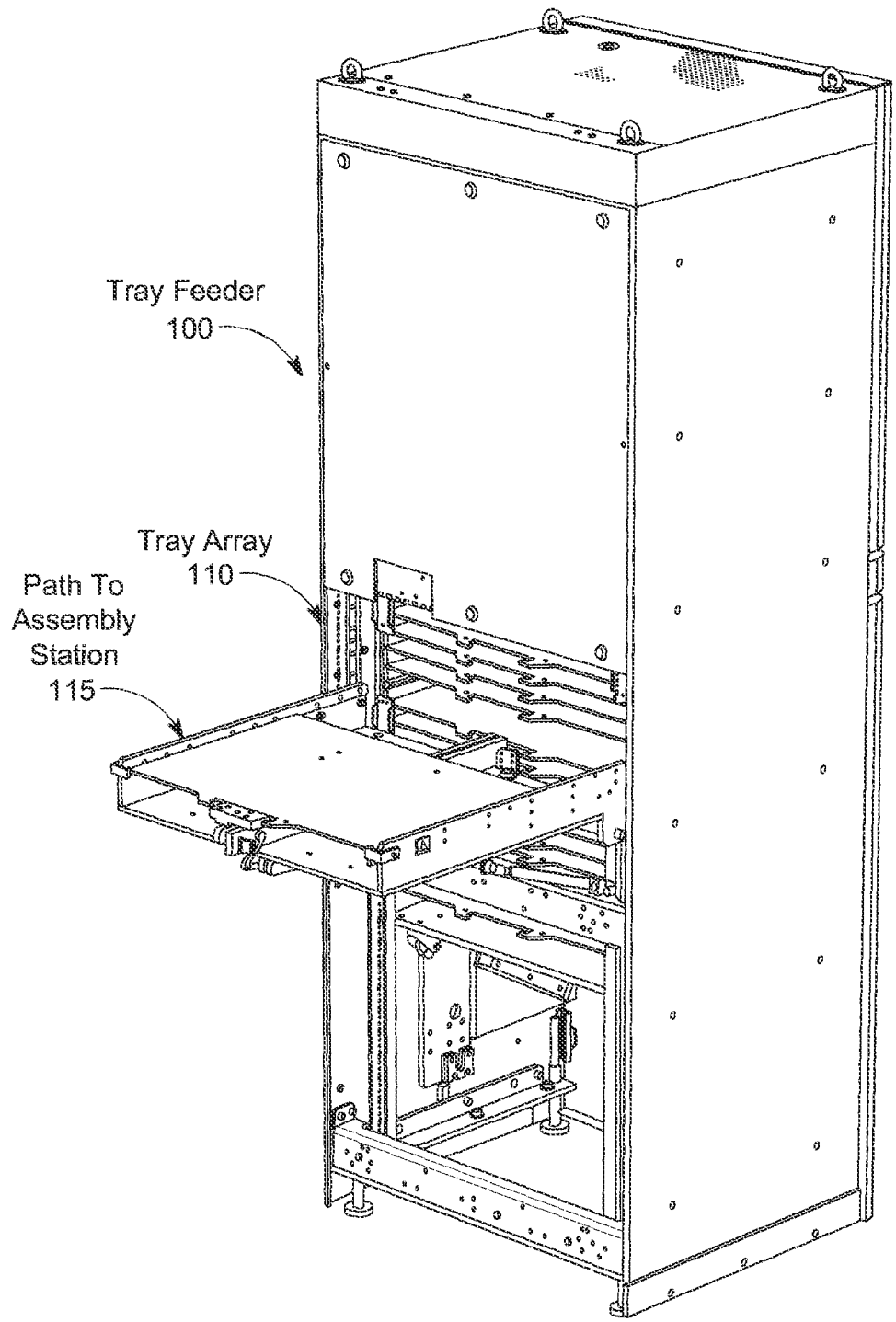
FIG. 1A is an illustration of one embodiment of a tray feeder including the improved tray puller.

FIG. 1A is an illustration of one embodiment of a tray feeder including the improved tray puller. The tray feeder 100 is an apparatus that provides trays including parts to an assembly station. The assembly station may be a robotic assembly system. The tray feeder includes a tray array 110 with a number of trays which are moved vertically up and down. There is a loading position, from which a path to the assembly station extends. A tray in the "loading position" may be removed to be moved to the assembly station. In general, the tray feeder 100 has numerous trays, and the trays include parts used by the assembly system. The trays are tracked, and the appropriate tray with the parts needed next is pulled.

Figure 1B:
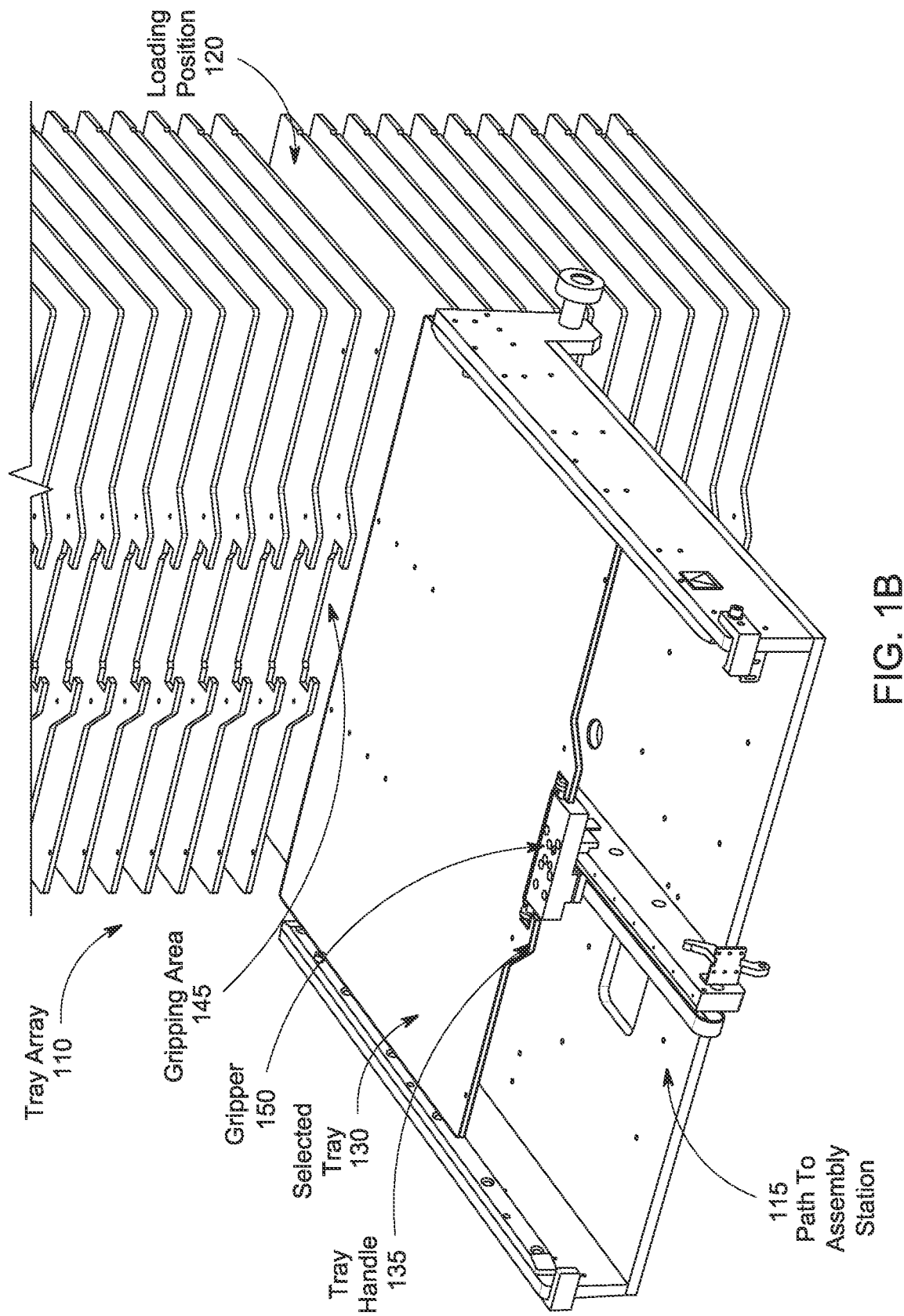
FIG. 1B is a perspective view of one embodiment of the tray pulling portion of the tray feeder.

FIG. 1B is a perspective view of one embodiment of the tray pulling portion of the tray feeder. For better visual representation the tray feeder itself has been removed, showing a "floating" tray array 110. The trays in the tray array are moved up and down by the tray feeder (not shown). When the movement stops, the tray in the loading position 120 is removed. This is done by the gripper 150.

Gripper 150 resides in the gripping area 145 defined by the tray handles 135. In one embodiment, the gripper 150 is inserted into the tray feeder initially, and when it is not pulling out a selected tray 130 it is pre-positioned in the gripping area. The gripper does not impede the vertical movement of the trays in the tray array. The vertical movement stops when the correct tray is in the loading position. At that point, the gripper moves out, pulling with it the selected tray 130. Because the gripper is pre-positioned in the gripping area, there is no wait time to move the gripper into position to remove the tray once the vertical movement stops.

Figure 1C:
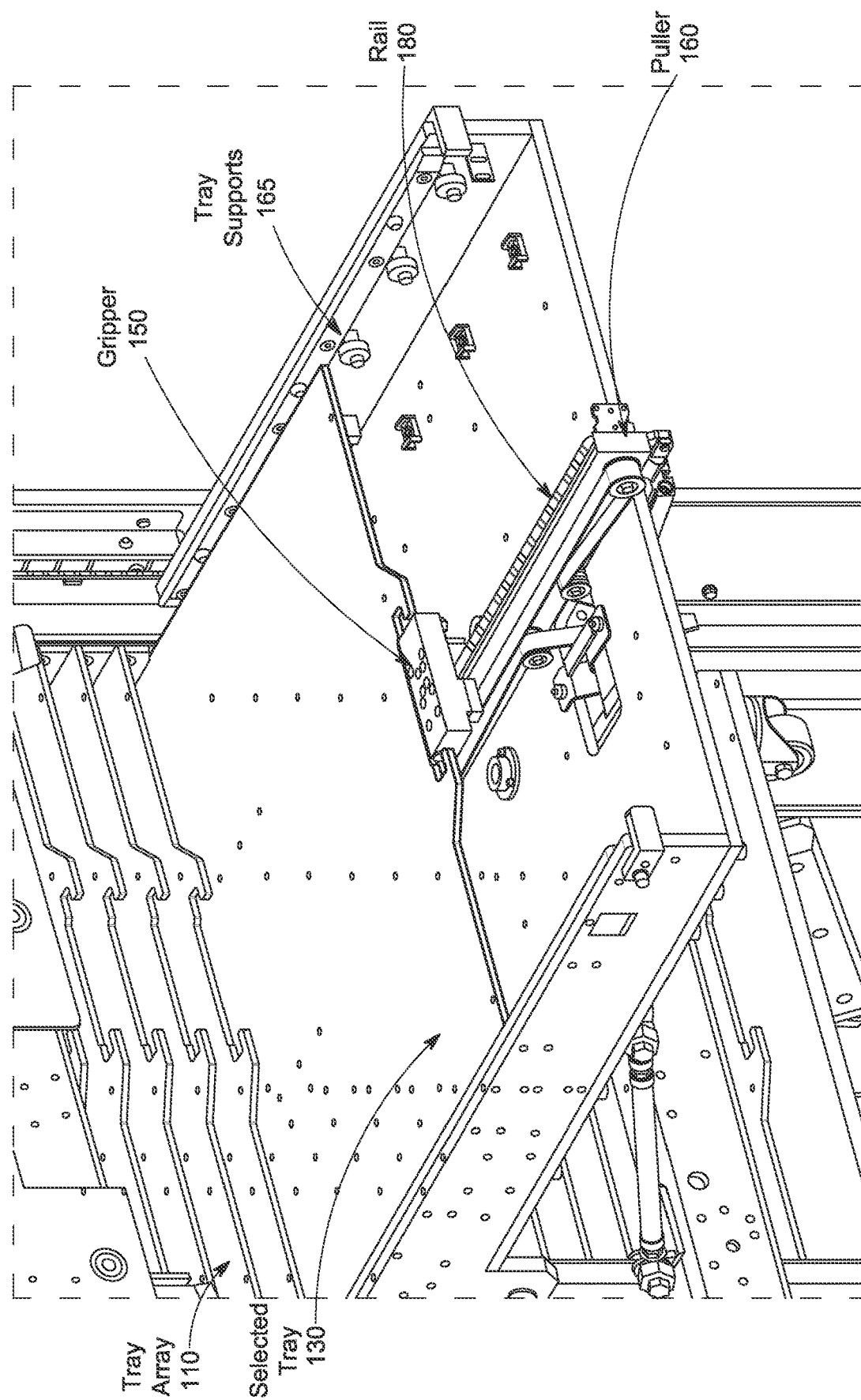
FIG. 1C is a perspective view of the tray pulling portion of the tray feeder of FIG. 1B.

FIG. 1C is a perspective view of the tray pulling portion of the tray feeder of FIG. 1B. This illustration shows the tray supports 165, which support the sides of the selected tray 130 when is being pulled by gripper 150. The puller 160, in one embodiment, is a belt-based puller. The gripper 150 in one embodiment rides along a rail 180.

FIG. 1D is a front view of one embodiment of the tray array. As can be seen, the gripper 150 resides in the gripping area 145 of the tray array 110. The front view shows the rail and puller associated with the gripper 150.

Figure 1E:
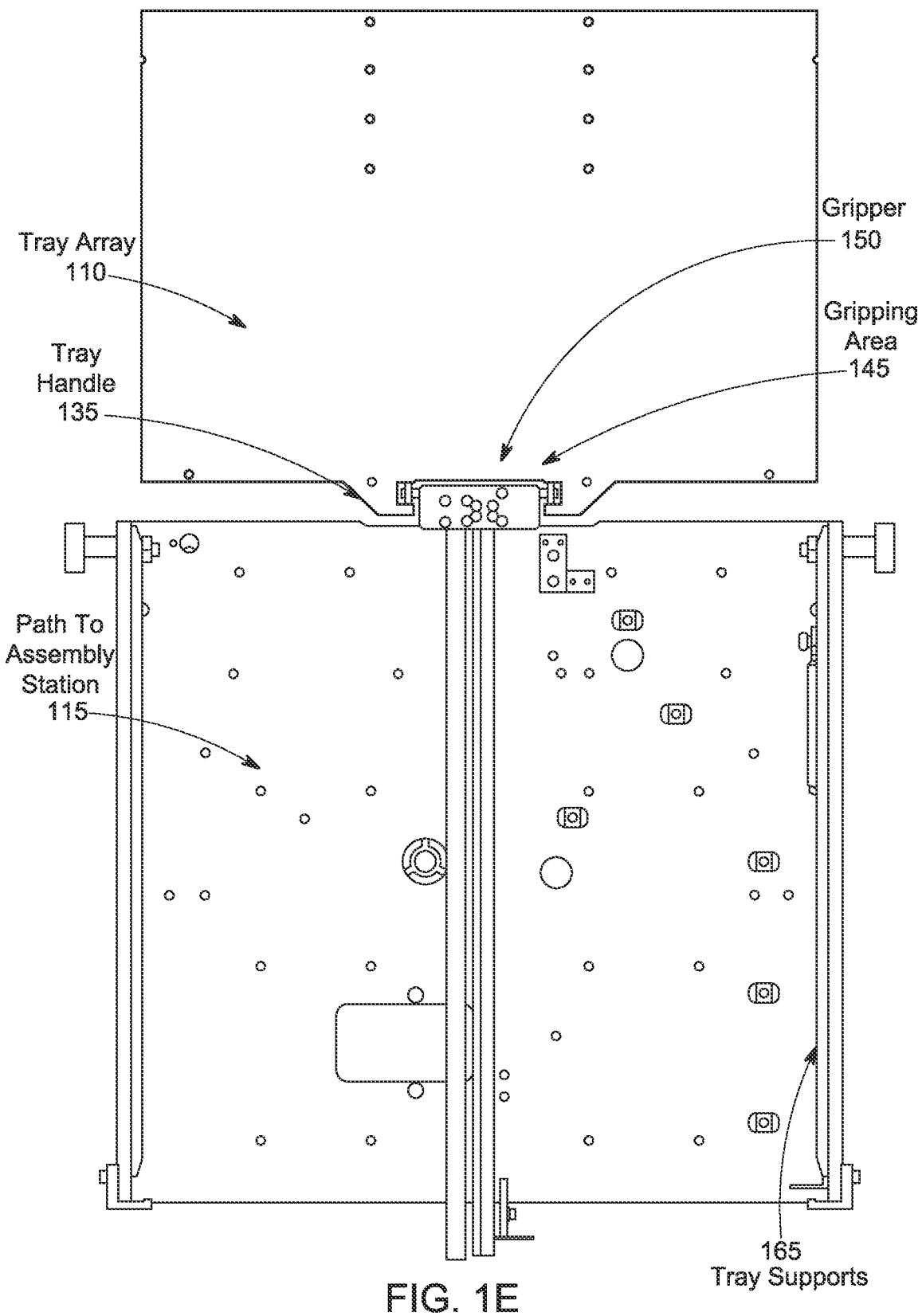
FIG. 1E is a top view of one embodiment of the tray pulling portion of the tray feeder.

FIG. 1E is a top view of one embodiment of the tray pulling portion of the tray feeder. In this case, the tray array 110 shows only one tray, since the trays are vertically stacked. The gripper 150 is pre-positioned in the gripping area 145. The portion of the path to the assembly station 115 is shown, as are the tray supports 165. This is the configuration prior to the gripper 150 pulling out a selected tray.

Figure 1F:
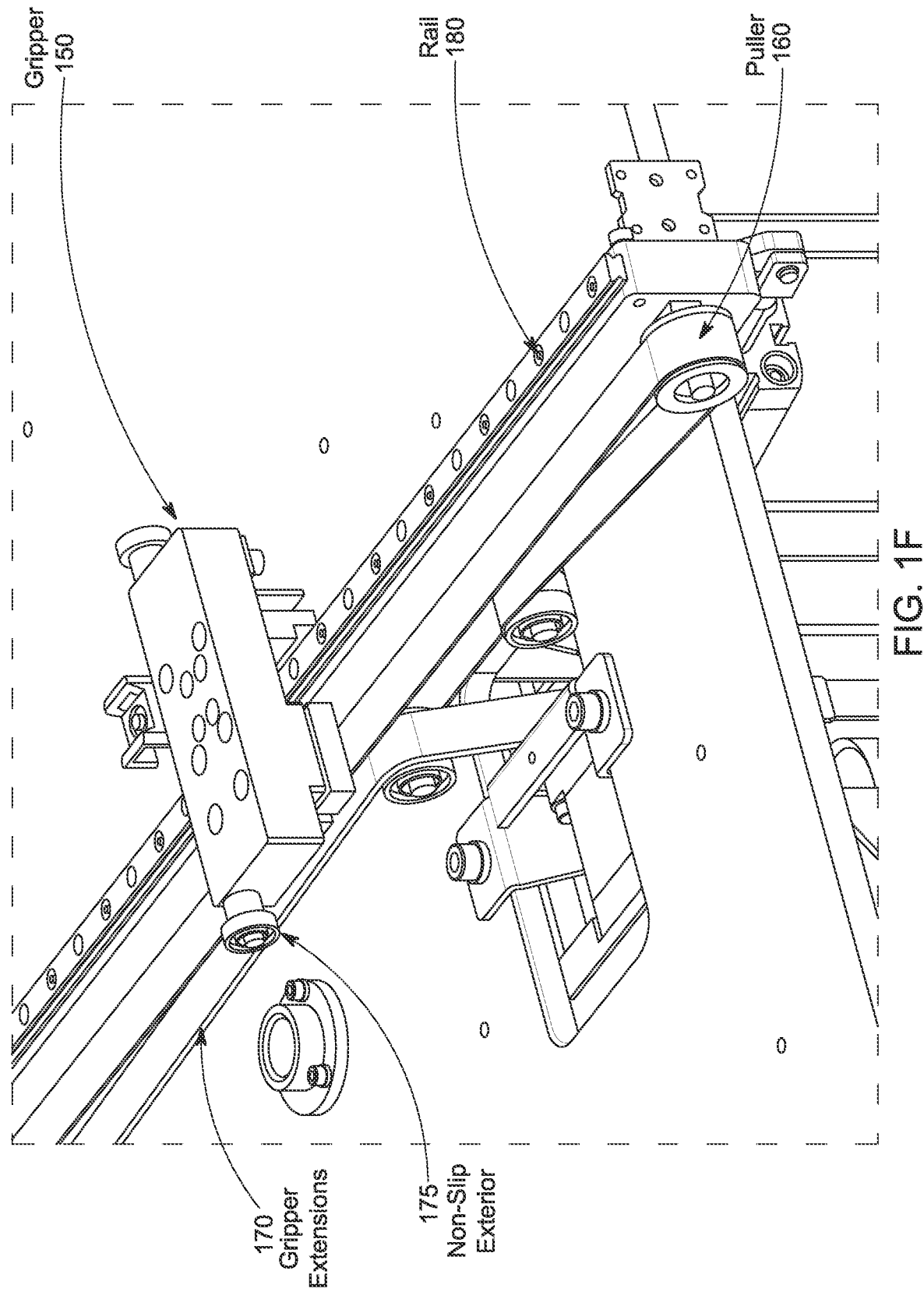
FIG. 1F is a perspective view of one embodiment of the gripper used to pull the trays from the tray feeder.

FIG. 1F is a perspective view of one embodiment of the gripper used to pull the trays from the tray feeder. The gripper 150 in one embodiment includes two gripper extensions 170. The gripper extensions 170 are the portions of the gripper 150 that engage with the selected tray for pulling it out, and for returning it. In one embodiment, the gripper extensions 170 are regular bearings. In one embodiment, the shape of the undercut in the tray (the handles) and the shape of the gripper extensions engaging with the handle are closely matched. This means that the tray cannot slip. In another embodiment, the gripper extensions 170 have a non-slip exterior 175 to ensure that the tray does not slip.

Figure 2:
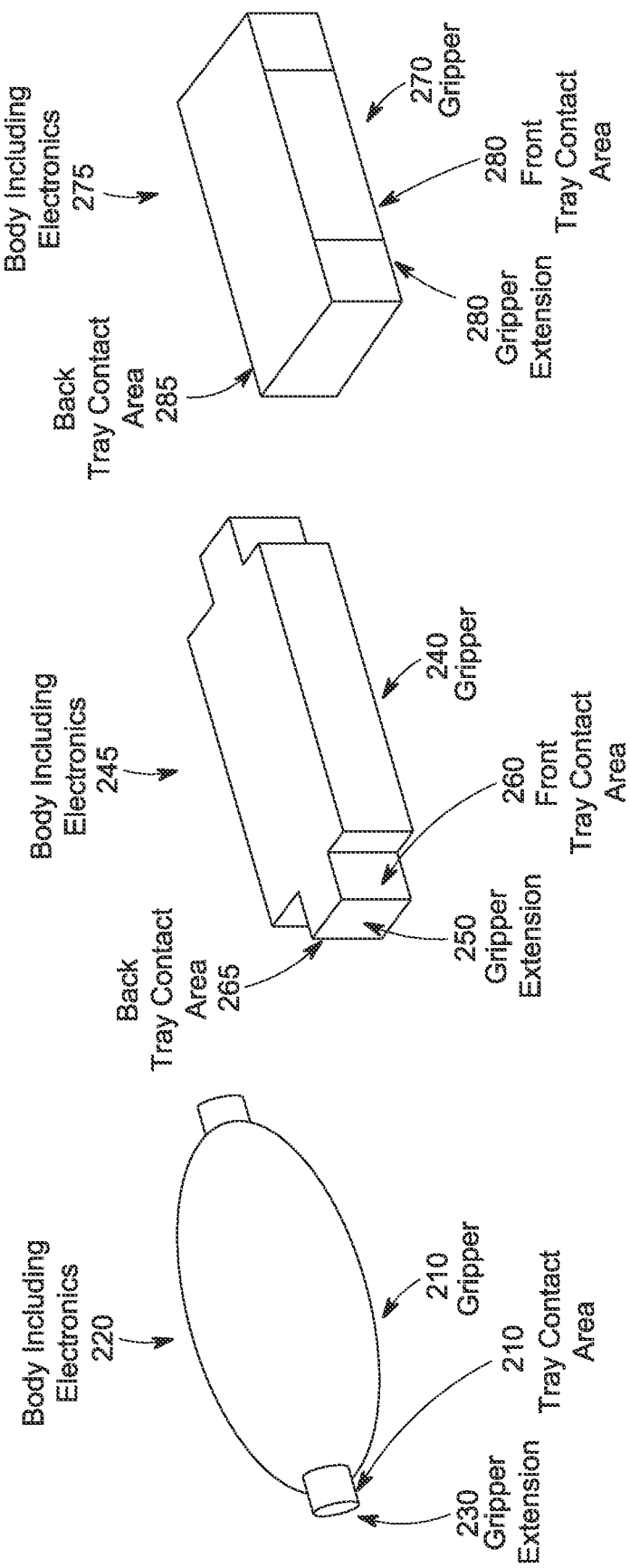
FIG. 2 is a simplified diagram of some alternative configurations of the gripper.

FIG. 2 is a simplified diagram of some alternative configurations of the gripper. The purpose of the gripper is fit within the gripping area, and to have a secure grip on the tray for pulling the tray out of the tray feeder, to take the tray to the staging area for the assembly station, and for pushing the tray back into the tray feeder. The actual shape of the gripper is not limited. Some grippers may include a separate gripper extension extending from the sides of the gripper body, which engages with the tray. Others may have the body of the gripper serve that purpose. The actual shape of the gripper extensions is not limited. Any shape which can securely engage with a tray may be used. In one embodiment, the portion of the gripper which engages with the tray has a non-slip coating. In one embodiment, that coating is rubber. In one embodiment, the shape of the gripper extensions (or portion of the gripper which engages with the tray handles for pushing and pulling the tray) is closely matched to the shape of the handles of the tray.

In one embodiment, the space between the portion of the gripper that engages with the tray and the tray handles is less than a millimeter. In one embodiment, the space is between 0.1 mm and 1 mm. In one embodiment, the distance between the gripper and then handles is between 1 mm and 10 mm. In one embodiment, in such case, a tray fixation device is used at the assembly station to stabilize the tray while in use. After the gripper moves the tray to the work area in the assembly station, a tray fixation device is used to stabilize the tray, because the gap provides "play" and enables movement of the tray during use. So, in one embodiment, the tray is fixed in place with an additional device. In one embodiment, then the tolerances are sufficiently tight to keep the tray from having any play, the tray fixation device does not need to be used because the gripper provides stabilization for the tray.

FIG. 2 illustrates some exemplary shapes for the body of the gripper 220, 245, 765, the gripper extensions 230, 250, and the tray contact areas 235, 260, 265, 280, 285. In one embodiment, the shape of the gripper extensions 230, 250 are closely matched to the undercut in the trays. In one embodiment, the tray contact areas have a non-slip coating to ensure that the gripper securely engages with the selected tray. In one embodiment, the gripper is designed such that the contact area of the gripper is in close proximity to the gripper handle when the gripper is positioned within the gripping area. This ensures that when the gripper starts moving, the tray moves with it, rather than having a collision between a moving gripper and the tray handle. These gripper shapes and configurations are merely exemplary, and one of skill in the art would understand that the shape of the gripper and gripper extensions is not limited by the shapes shown. Rather, any shape that provides sufficient contact area for the tray, and sufficient stability for pushing and pulling may be used.

Figure 3:
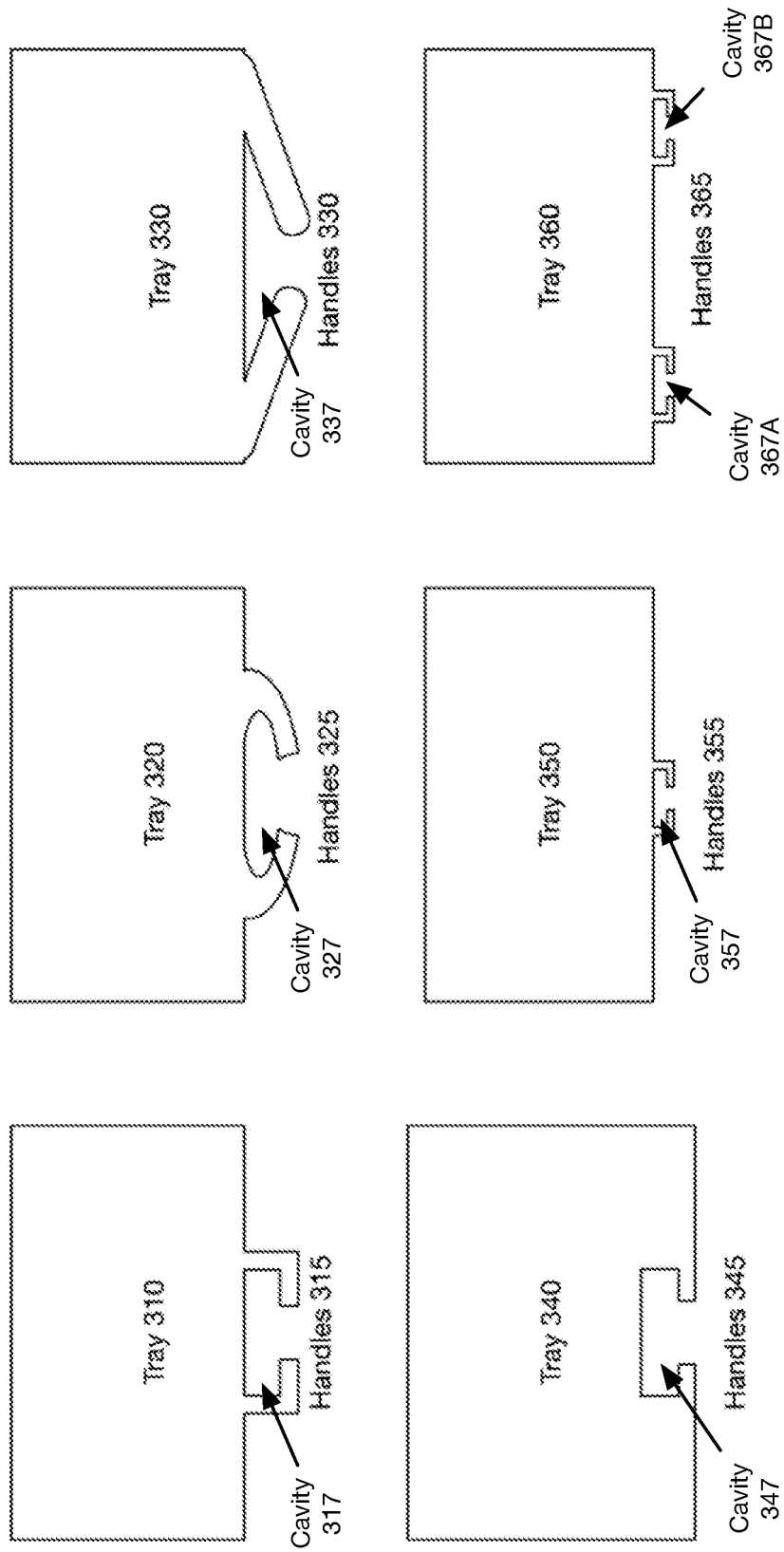
FIG. 3 illustrates some alternative configurations of the tray including various tray grips.

FIG. 3 illustrates a-simplified illustrations of some alternative configurations of the tray including various tray handles or grips. The purpose of the tray is to provide a standard surface for carrying elements to an assembly station. The size of the tray is defined by the tray feeder's configuration. Each tray 310, 320, 330, 340, 350, 360 has a handle 315, 325, 335, 345, 355, 365, and the cavity 317, 327, 337, 347, 357, 367A & 367B defined by the handles is the space where the gripper rests when no tray has been removed. Each tray in a particular configuration includes a substantially identical handle, defining a substantially identical cavity. However, the actual shape of the handles 315, 325, 335, 345, 355, 365 and thus the shape of the gripping areas is not limited. Any shape having an undercut with which the gripper can engage, and a gap enabling the puller to pull the gripper, may be used. The size of the handles may also vary, as long as they are sturdy enough to support the tray for pulling out.

FIG. 3 illustrates some exemplary handle configurations, including square handles 315, extending from tray 310, defining rectangular cavity 317. The handles 325 may be rounded, as shown in tray 320, defining ovoid cavity 327. The handles 335 may be triangular as shown with tray 330, defining a triangular cavity 337. The handles 345 may be cut into the tray rather than extending from the tray, as shown in tray 340, defining cavity 347. The handles 355 may be quite thin, as shown in tray 350, defining cavity 357. There may be more than one set of handles 365 as shown in tray 360, defining multiple cavities 367A and 367B. For configurations with more than one handle, each handle has an associated gripper, and in one embodiment the grippers move in unison. These tray shapes and cavity shapes are merely exemplary, and one of skill in the art would understand that the shape of the tray handles is not limited by the shapes shown. Rather, any shape that provides sufficient contact area for the gripper, and sufficient stability for pushing and pulling may be used. However, the tray shapes must be consistent within a tray loader, in one embodiment.

Figure 4:
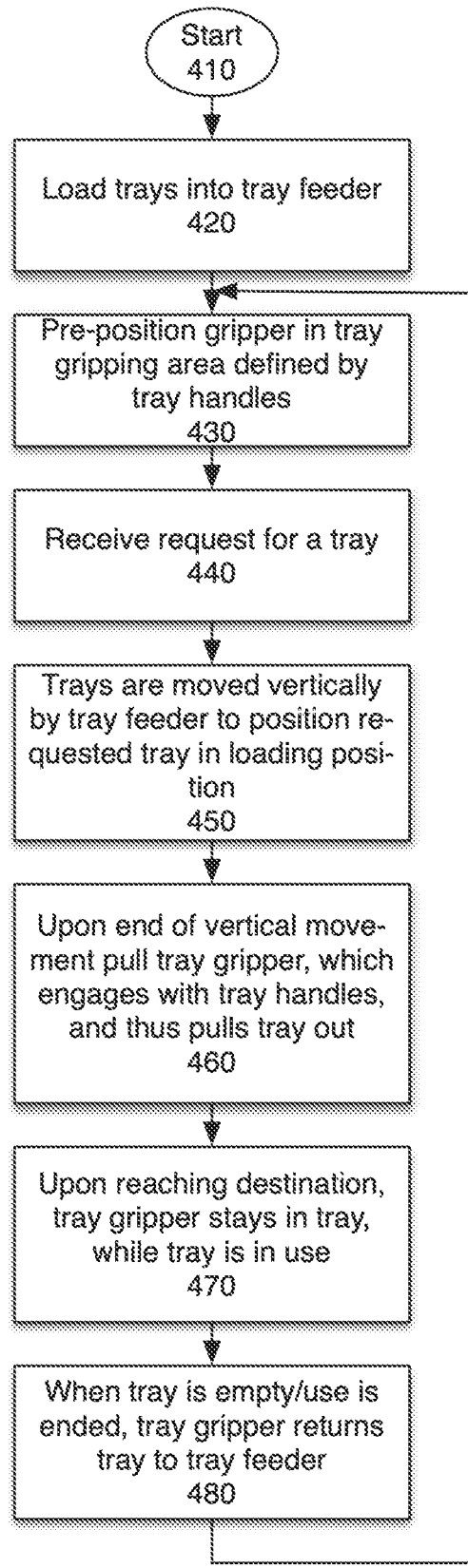
FIG. 4 is a flowchart of one embodiment of using the tray puller.

FIG. 4 is a flowchart of one embodiment of using the tray puller. The process starts when the tray feeder is initially assembled. The gripper is pre-positioned in the gripping area. The trays are loaded, at block 420. In one embodiment, trays are loaded from above or below.

At block 430, the tray feeder is operative, with trays loaded, and the tray gripper pre-positioned in the gripping area.

At block 440, a request for a tray is received. The tray is identified, in one embodiment, by number or another identifier. The request, in one embodiment, is received from the assembly station which utilizes the parts on the trays. In one embodiment, the request may be generated automatically when a used tray (which may be empty or not) is returned to the tray array. For example, the sequence of trays may be pre-programmed/preset, and thus the tray feeder may automatically move the next tray in the assembly sequence to the loading position, when a tray is returned.

At block 450, the tray array is moved vertically within the tray feeder, to position the requested tray in the loading position. The loading position is aligned with the path to the assembly station.

At block 460, the gripper pulls out the tray in the loading position. This may occur very rapidly after the vertical movement stops. The gripper engages with the tray handles and pulls the tray to the correct position for the assembly station. In one embodiment, the puller is activated, which moves the gripper and thus the tray from the tray area, by receiving a signal from the tray feeder that the correct tray is in the loading position. In another embodiment, the puller is automatically activated when the vertical motion stops, without a separate signal. Because the gripper is prepositioned in the gripping area, there is no necessary delay prior to the removal of the tray, for moving the gripper into place.

At block 470, upon reaching the destination, the tray gripper stops, remaining in place while the tray is in use. In one embodiment, the tray may be locked in place while it is in use.

At block 480, when the tray is empty, or the use is ended, the gripper returns the tray to the tray feeder. In one embodiment, the now-empty tray is placed in the same slot from which it was removed, returning the gripper to the gripping area. In another embodiment, the tray may be returned to any empty slot in the tray feeder. This enables the substitution of a new tray arrays, while a tray is in use. If a tray array is substituted while a tray is in use, the new tray array includes one empty slot, into which the currently active tray is returned. In this way, the assembly process can continue without interruption, when the last tray has been pulled from a tray array.

The process continues to block 430, with the gripper positioned in the gripping area, and ready to pull the next tray when a request is received. In this way, the system speeds up the tray pulling and returning process, by eliminating the period between when the vertical motion of the trays stops and when the gripper is ready to pull out the tray. In one embodiment, this reduction in takt time may be significant, especially if trays are pulled multiple times in a single assembly process.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A tray feeder mechanism comprising:
   a plurality of trays within a tray array, each tray including a tray handle and a cavity defined by the tray handle, the cavity defined by the tray handle defining a gripping area;
   a gripper positioned within the gripping area defined by the tray handles;
   such that the tray array is configured to move vertically within the tray feeder mechanism to move a tray into a loading position while the gripper is positioned within the gripping area, enabling the gripper to remove a tray from the tray feeder when the tray feeder stops without wait time to move the gripper into position to remove the tray.

2. The tray feeder mechanism of claim 1, wherein the tray handle comprises two hooked elements, defining an opening and the cavity.

3. The tray feeder mechanism of claim 2, wherein the opening is to accommodate a puller which moves the gripper.

4. The tray feeder mechanism of claim 1, further comprising:
   the gripper having two extensions on either side of the gripper, the extensions engaging with the tray handles, to move the tray.

5. The tray feeder mechanism of claim 4, wherein the extensions are closely matched to a shape of the tray handle, having a clearance between 0.1 mm and 10 mm.

6. The tray feeder mechanism of claim 4, wherein the extensions are round and are made of an elastic material.

7. A method of utilizing a tray feeder comprising:
   loading a plurality of trays into the tray feeder, the plurality of trays comprising a tray array, wherein each of the trays has a handle, the handle including a cavity defining a gripping area;
   positioning a gripper in the gripping area defined by the handles of the trays;
   when a tray is requested, the tray feeder moving the tray array, so the requested tray is in a loading position, while the gripper is in the gripping area; and
   the gripper removing the tray from the tray array when the tray array movement is stopped without wait time to move the gripper into position to remove the tray.

8. The method of claim 7, wherein the tray handle comprises two hooked elements, defining an opening and a cavity, the cavity comprising the gripping area.

9. The method of claim 8, wherein the opening is to accommodate a puller which moves the gripper.

10. The method of claim 7, wherein the gripper has two extensions on either side of the gripper, the extensions engaging with the tray handles, to move the tray.

11. The method of claim 10, wherein the extensions are non-slip.

12. The method of claim 10, wherein the extensions are round and are made of an elastic material.

13. The method of claim 10, wherein the extensions are closely matched to a shape of the tray handle, having a clearance between 0.1 mm and 10 mm.

14. The method of claim 7, further comprising:
pulling the tray to a staging area for an assembly station;
returning the tray to an empty slot in the tray array, when the assembly station is done with the tray; and
leaving the gripper in the gripping area, while the tray feeder moves a new tray to the loading position.

15. A tray feeder mechanism comprising:
a tray feeder including a tray array with a plurality of trays, the tray feeder moving trays vertically up and down, the tray feeder having a loading position, where an individual tray in the loading position is configured to be removed from the tray array;
a gripping area defined by handles of the plurality of trays;
a gripper positioned in the gripping area while the tray feeder is moving the trays vertically;
wherein the gripper is configured to immediately remove the individual tray in the loading position when the tray array stops moving, without a wait time to move the gripper into position.

16. The tray feeder mechanism of claim 15, wherein the tray handle comprises two hooked elements, defining an opening and a cavity, the cavity comprising the gripping area.

17. The tray feeder mechanism of claim 16, wherein the opening is to accommodate a puller which moves the gripper.

18. The tray feeder mechanism of claim 15, further comprising:
the gripper having two extensions on either side of the gripper, the extensions engaging with the tray handles, to move the tray.

19. The tray feeder mechanism of claim 18, wherein the extensions are non-slip.

20. The tray feeder mechanism of claim 19, wherein the extensions are round and are made of an elastic material.

\* \* \* \* \*